United States Patent
Tashiro et al.

(10) Patent No.: US 11,615,935 B2
(45) Date of Patent: Mar. 28, 2023

(54) ELECTRICAL CONNECTION BOX AND WIRE HARNESS

(71) Applicant: Yazaki Corporation, Tokyo (JP)

(72) Inventors: Hiroki Tashiro, Shizuoka (JP); Ryouichi Yokoyama, Shizuoka (JP); Takuma Kaneko, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 203 days.

(21) Appl. No.: 17/133,642

(22) Filed: Dec. 24, 2020

(65) Prior Publication Data
US 2021/0210301 A1    Jul. 8, 2021

(30) Foreign Application Priority Data

Jan. 7, 2020 (JP) .............................. JP2020-000908

(51) Int. Cl.
| | |
|---|---|
| *H01R 4/30* | (2006.01) |
| *H01R 9/22* | (2006.01) |
| *H01H 85/20* | (2006.01) |
| *B60R 16/02* | (2006.01) |
| *B60R 16/023* | (2006.01) |
| *H01R 13/696* | (2011.01) |
| *H01R 25/16* | (2006.01) |

(52) U.S. Cl.
CPC ....... *H01H 85/205* (2013.01); *B60R 16/0207* (2013.01); *B60R 16/0238* (2013.01); *H01R 9/226* (2013.01); *H01R 13/696* (2013.01); *H01R 25/16* (2013.01); *H01H 2085/208* (2013.01)

(58) Field of Classification Search
None
See application file for complete search history.

(56) References Cited

U.S. PATENT DOCUMENTS

| | | | |
|---|---|---|---|
| 6,322,376 B1 * | 11/2001 | Jetton .................... | H01R 4/302 411/107 |
| 7,670,184 B2 * | 3/2010 | Akahori ................ | H05K 7/026 439/949 |
| 7,850,462 B2 * | 12/2010 | Nakagawa ........... | H01R 11/287 439/949 |

(Continued)

FOREIGN PATENT DOCUMENTS

| | | |
|---|---|---|
| EP | 3142191 A1 | 3/2017 |
| JP | H5-326053 A | 12/1993 |

(Continued)

*Primary Examiner* — Felix O Figueroa
(74) *Attorney, Agent, or Firm* — Kenealy Vaidya LLP

(57) ABSTRACT

Flat surfaces out of two flat surfaces of each of flat electrical connection bodies of a relay bus bar and a bus bar of an electronic component are mating surfaces brought into contact with each other by a fixing structure. At least one of the flat electrical connection bodies of the relay bus bar and the bus bar applies a reaction force accompanying the elastic deformation to the other flat electrical connection body, to which the one flat electrical connection body is to be connected, in a state in which the flat electrical connection body of the bus bar at an accommodation completion position in a housing has not been connected to the relay bus bar. The housing includes a receiving portion receiving a force applied to the flat electrical connection body of the bus bar from the flat electrical connection body of the relay bus bar.

9 Claims, 10 Drawing Sheets

(56) References Cited

U.S. PATENT DOCUMENTS

| | | | |
|---|---|---|---|
| 7,931,479 B1 * | 4/2011 | De La Reza | B60R 16/0238 |
| | | | 439/949 |
| 8,035,040 B2 * | 10/2011 | Nishikawa | B60R 16/0238 |
| | | | 174/541 |
| 8,961,198 B2 * | 2/2015 | Ferran Palau | H01R 9/226 |
| | | | 439/949 |
| 2004/0166744 A1 | 8/2004 | Inaba et al. | |
| 2011/0294317 A1 | 12/2011 | Nishio et al. | |
| 2011/0306221 A1 | 12/2011 | Kamo | |
| 2016/0351368 A1 | 12/2016 | Ikeda et al. | |
| 2017/0077624 A1 | 3/2017 | Marmonier et al. | |
| 2019/0244774 A1 | 8/2019 | Horiuchi et al. | |

FOREIGN PATENT DOCUMENTS

| | | | |
|---|---|---|---|
| JP | 2010-063269 A | 3/2010 | |
| JP | 2012-5162 A | 1/2012 | |

* cited by examiner

ELECTRICAL CONNECTION BOX AND WIRE HARNESS

CROSS-REFERENCE TO RELATED APPLICATION(S)

The present application claims priority to and incorporates by reference the entire contents of Japanese Patent Application No. 2020-000908 filed in Japan on Jan. 7, 2020.

BACKGROUND OF THE INVENTION

1. Field of the Invention

The present invention relates to an electrical connection box and a wire harness.

2. Description of the Related Art

In an electrical connection box, a housing accommodates an electronic component (e.g., a circuit protection component such as a fuse and a fusible link, and a relay), which is electrically connected to another electronic component or an electrical wire via a relay bus bar in the housing. In such a conventional electrical connection box, for example, the housing holds the relay bus bar therein, and holds the electronic component via the relay bus bar by connecting a bus bar of the electronic component to the relay bus bar. The relay bus bar and the bus bar of the electronic component are, for example, screwed together to be connected to each other. That is, the relay bus bar and the bus bar of the electronic component are connected to each other after the electronic component is inserted to an accommodation completion position in the housing. This type of electrical connection box is disclosed in, for example, Japanese Patent Application Laid-open No. 2012-005162.

In the electrical connection box as described above, it is desirable to temporarily hold the electronic component at the accommodation completion position in the housing until a connection operation between the relay bus bar and the bus bar of the electronic component is completed. To produce such a temporary hold state, a locking structure using, for example, a claw may be provided between the housing and the electronic component. However, the cost and the size of the electrical connection box can be increased by providing a locking structure having a complicated shape.

SUMMARY OF THE INVENTION

Thus, an object of the present invention is to provide an electrical connection box and a wire harness capable of temporarily holding an electronic component in a housing using a simple structure.

In order to achieve the above mentioned object, an electrical connection box according to one aspect of the present invention includes an insulating housing; a conductive relay bus bar held by the housing within the housing; an electronic component configured to be inserted to an accommodation completion position within the housing and provided with a conductive bus bar to be connected to the relay bus bar; and a fixing structure configured to physically and electrically connect the bus bar at the accommodation completion position to the relay bus bar held by the housing in advance, wherein the relay bus bar includes a plurality of electrical connection bodies and a coupling body coupling the electrical connection bodies, at least one of the electrical connection bodies is a plate-like flat electrical connection body, two flat surfaces of which extend along an insertion direction of the electronic component with respect to the housing within the housing, the bus bar includes a plate-like flat electrical connection body, two flat surfaces of which extend along the insertion direction, one of the two flat surfaces of the flat electrical connection body of the relay bus bar and one of the two flat surfaces of the flat electrical connection body of the bus bar are mating surfaces to be brought into contact with each other by the fixing structure, at least one of the respective flat electrical connection bodies of the relay bus bar and the bus bar has such flexibility as to enable elastic deformation in a direction crossing the mating surfaces, applying a reaction force accompanying the elastic deformation to the other flat electrical connection body, to which the one flat electrical connection body is to be connected, in a state in which the flat electrical connection body of the bus bar at the accommodation completion position has not been connected to the flat electrical connection body of the relay bus bar by the fixing structure, and the housing includes a receiving portion configured to receive, from the electronic component, a force applied to the flat electrical connection body of the bus bar from the flat electrical connection body of the relay bus bar.

According to another aspect of the present invention, in the electrical connection box, it is possible to configure that the flat electrical connection body of the relay bus bar within the housing is disposed on an insertion trajectory of the flat electrical connection body of the bus bar with respect to the housing.

According to still another aspect of the present invention, in the electrical connection box, it is possible to configure that the housing has an insertion port through which the electronic component is inserted to the accommodation completion position, and the flat electrical connection body of the relay bus bar includes, at its end near the insertion port within the housing, a guiding portion configured to guide the mating surface of the flat electrical connection body of the bus bar inserted from the insertion port to the mating surface of the flat electrical connection body of the relay bus bar.

According to still another aspect of the present invention, in the electrical connection box, it is possible to configure that the fixing structure includes through holes respectively formed in the flat electrical connection bodies of the relay bus bar and the bus bar, a female screw member arranged facing the other of the two flat surfaces of the flat electrical connection body of the relay bus bar, and a male screw member inserted through the through holes from the other of the two flat surfaces of the flat electrical connection body of the bus bar to be screwed into the female screw member.

In order to achieve the above mentioned object, a wire harness according to still another aspect of the present invention includes an insulating housing; a conductive relay bus bar held by the housing within the housing; an electronic component configured to be inserted to an accommodation completion position within the housing and provided with a conductive bus bar to be connected to the relay bus bar; a fixing structure configured to physically and electrically connect the bus bar at the accommodation completion position to the relay bus bar held by the housing in advance; and an electrical wire electrically connected to the relay bus bar and the bus bar and pulled out from an inside of the housing, wherein the relay bus bar includes a plurality of electrical connection bodies and a coupling body coupling the electrical connection bodies, at least one of the electrical connection bodies is a plate-like flat electrical connection body, two flat surfaces of which extend along an insertion direction of the electronic component with respect to the housing within the housing, the bus bar includes a plate-like flat electrical connection body, two flat surfaces of which extend along the insertion direction, one of the two flat surfaces of the flat electrical connection body of the relay bus bar and one of the two flat surfaces of the flat electrical connection body of the bus bar are mating surfaces to be brought into contact with each other by the fixing structure, at least one of the respective flat electrical connection bodies of the relay bus bar and the bus bar has such flexibility as to enable elastic deformation in a direction crossing the mating surfaces, applying a reaction force accompanying the elastic deformation to the other flat electrical connection body, to which the one flat electrical connection body is to be connected, in a state in which the flat electrical connection body of the bus bar at the accommodation completion position has not been connected to the flat electrical connection body of the relay bus bar by the fixing structure, and the housing includes a receiving portion configured to receive, from the electronic component, a force applied to the flat electrical connection body of the bus bar from the flat electrical connection body of the relay bus bar.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment of an electrical connection box and a wire harness according to the present invention will be described in detail based on the drawings. Note that this embodiment is not intended to limit the present invention.

Embodiment

One embodiment of the electrical connection box and the wire harness according to the present invention will be described based on FIGS. 1 to 10.

Figure 1:
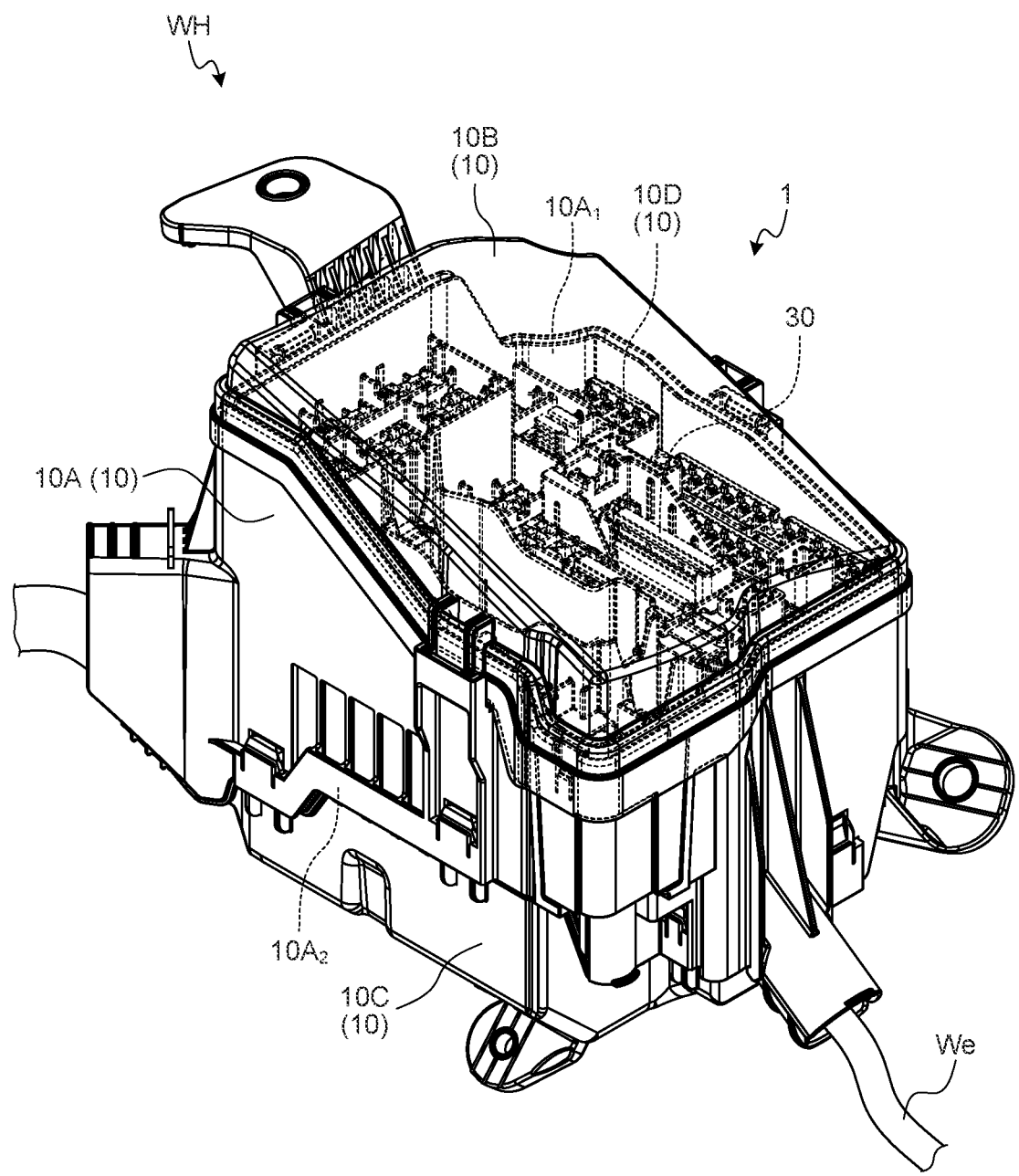
FIG. 1 is a perspective view illustrating an electrical connection box and a wire harness of an embodiment.
Figure 2:
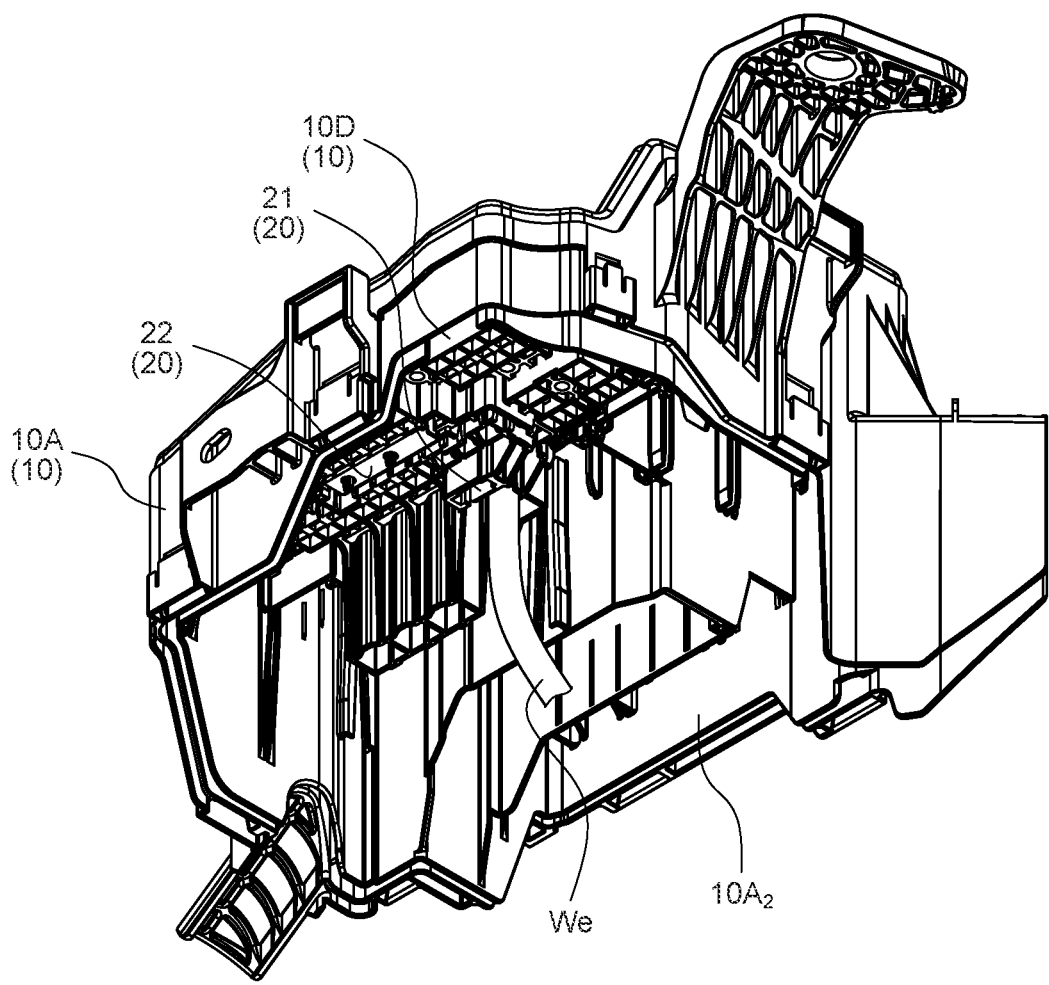
FIG. 2 is a perspective view illustrating a frame, an accommodation member, and an accommodated component related thereto of the electrical connection box.
Figure 3:
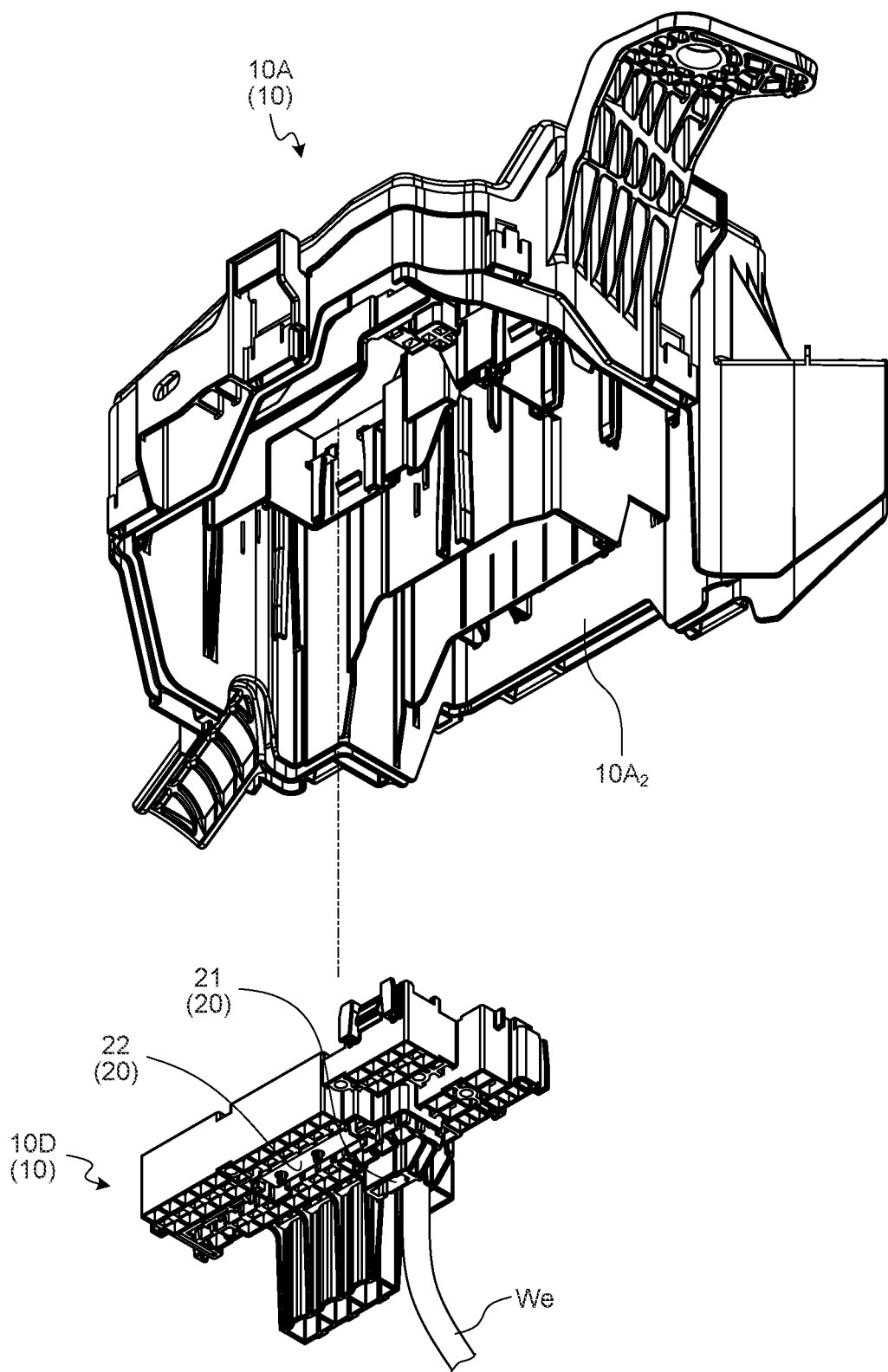
FIG. 3 is an exploded perspective view of the frame of the electrical connection box, and the accommodation member and the accommodated component related thereto, removed from the frame.

Reference numeral 1 in FIG. 1 denotes an electrical connection box of the present embodiment. Reference sign WH in FIG. 1 denotes a wire harness of the present embodiment including the electrical connection box 1.

The electrical connection box 1 of the present embodiment includes an insulating housing 10 (FIGS. 1 to 8). The electrical connection box 1 also includes a conductive relay bus bar 20 held by the housing 10 within the housing 10 (FIGS. 2 to 8). The electrical connection box 1 also includes an electronic component 30 inserted to an accommodation completion position within the housing 10 and electrically connected to the relay bus bar 20 (FIGS. 1 and 4 to 8). The electronic component 30 includes a conductive bus bar 40 connected to the relay bus bar 20 (FIGS. 4 to 8). In the electrical connection box 1, at least one relay bus bar 20 and at least one electronic component 30 are provided within the housing 10. The electrical connection box 1 further includes a fixing structure 50 that physically and electrically connects the bus bar 40 at the accommodation completion position to the relay bus bar 20 held by the housing 10 in advance (FIGS. 4 to 8). In the electrical connection box 1, an electrical wire We is electrically connected to the relay bus bar 20 and the bus bar 40 within the housing 10, and pulled out from the inside of the housing 10 (FIGS. 1 to 3, 6, and 7). The electrical connection box 1, together with the electrical wire We, constitutes the wire harness WH.

Figure 4:
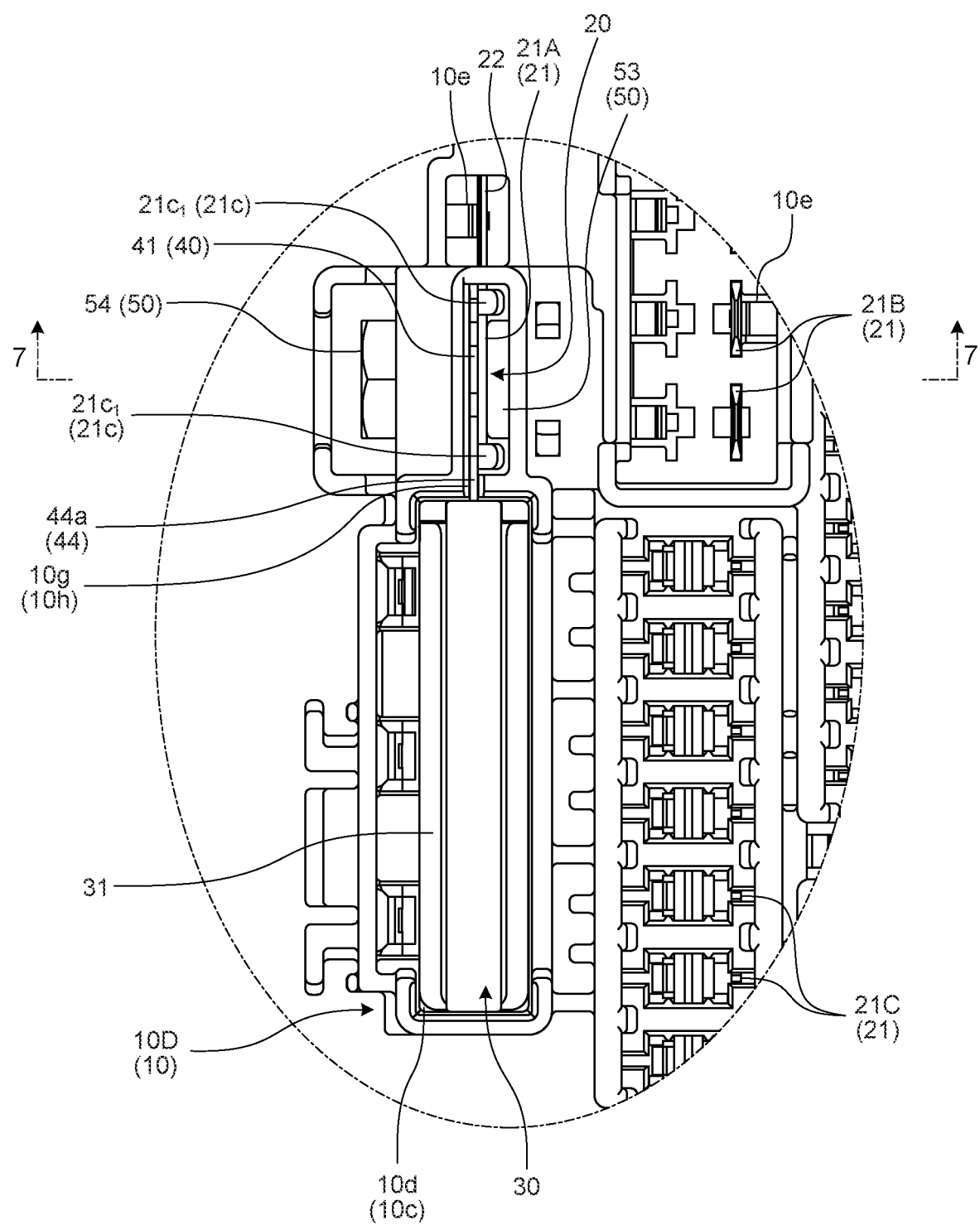
FIG. 4 is a plan view of the accommodation member and the accommodated component related thereto as viewed from an insertion port side of an electronic component.
Figure 5:
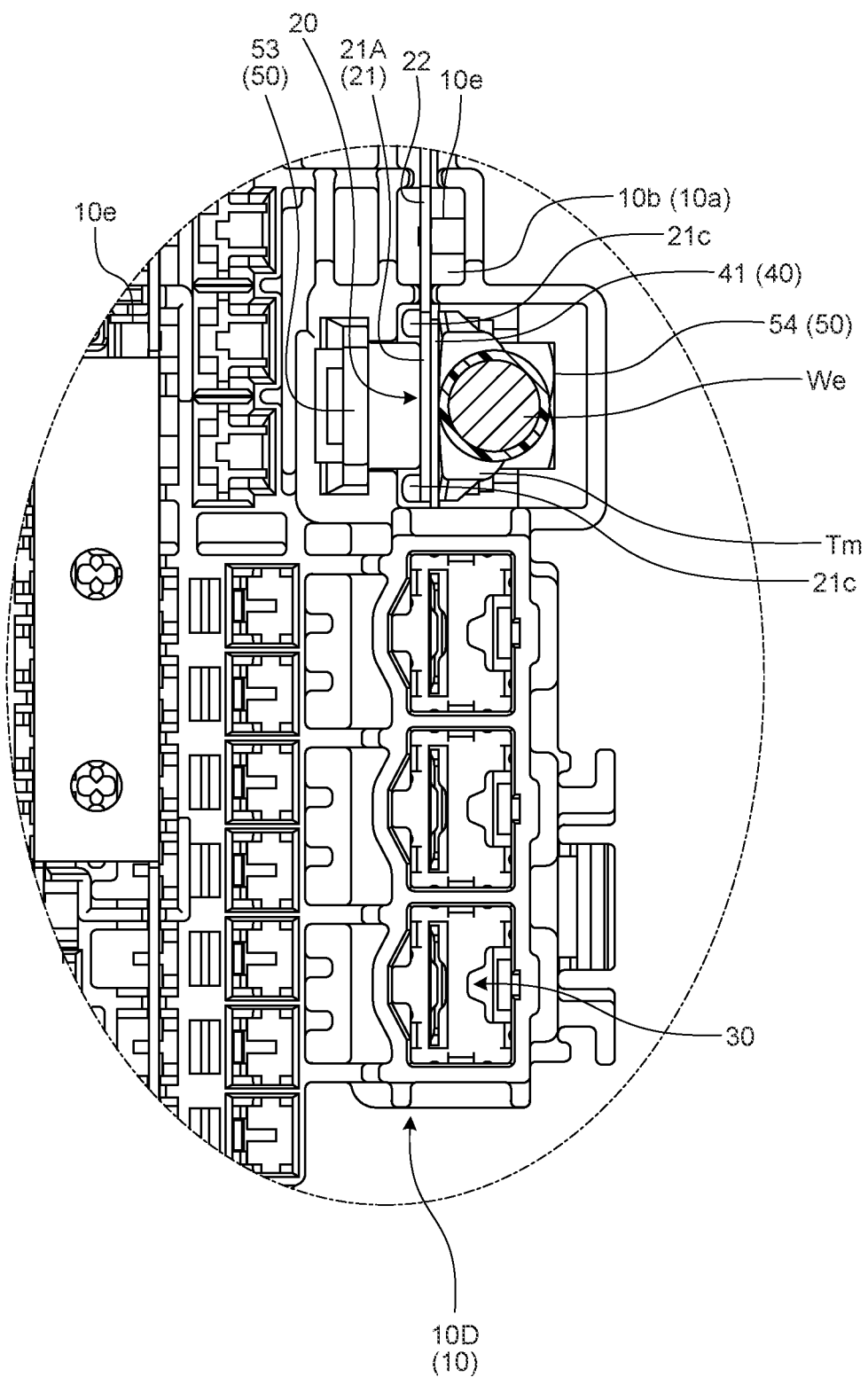
FIG. 5 is a plan view of the accommodation member and the accommodated component related thereto as viewed from an insertion port side of a relay bus bar.
Figure 6:
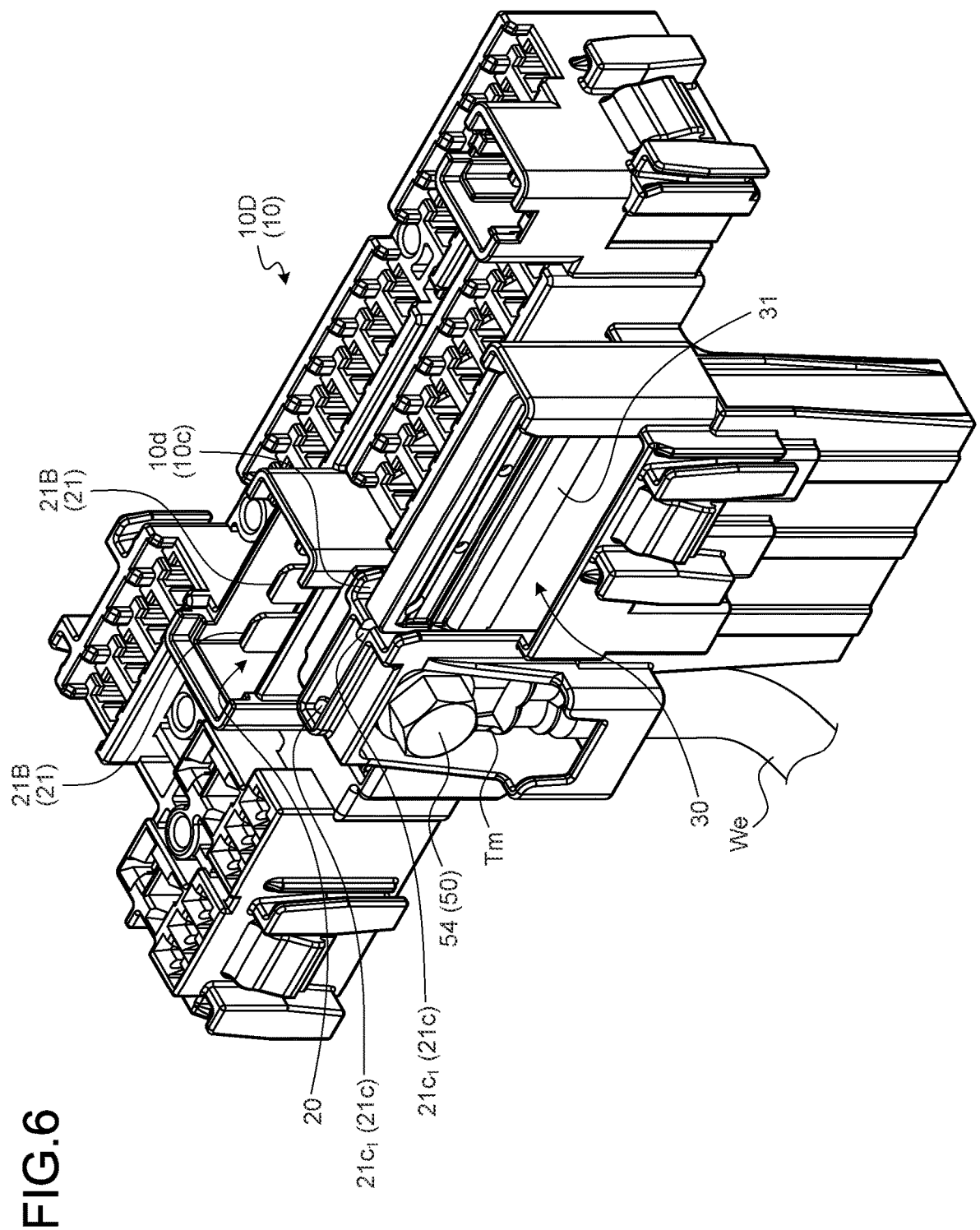
FIG. 6 is a perspective view illustrating the accommodation member and the accommodated component related thereto.

The housing 10 is formed of an insulating material such as synthetic resin. The housing 10 has an accommodation chamber 10a that accommodates the relay bus bar 20 (FIG. 5). The accommodation chamber 10a is used as an accommodation completion position for the relay bus bar 20 in the housing 10. The housing 10 has an insertion port 10b through which the relay bus bar 20 is inserted to the accommodation completion position (FIG. 5). Note that the housing 10 may be formed integrally with the relay bus bar 20 by insert molding or the like. In this case, the accommodation chamber 10a and the insertion port 10b are not provided. The housing 10 also has an accommodation chamber 10c that accommodates the electronic component 30 (FIGS. 4 and 6). The accommodation chamber 10c is used as the accommodation completion position for the electronic component 30 in the housing 10. The housing 10 has an insertion port 10d through which the electronic component 30 is inserted to the accommodation completion position (FIGS. 4 and 6).

The housing 10 may be an accommodation box formed by assembling a plurality of divided housing bodies that are formed individually, or may be formed as a single box body. The housing 10 in this example is composed of three divided housing bodies including a frame 10A, an upper cover 10B, and a lower cover 10C (FIG. 1). The frame 10A is formed in a cylindrical shape with open opposite ends. In the housing 10, a first opening $10A_1$ of the frame 10A is closed by the upper cover 10B, and a second opening $10A_2$ of the frame 10A by the lower cover 10C.

The housing 10 in this example further includes at least one accommodation member 10D removably accommodated within the frame 10A (FIGS. 1 to 8). The accommodation member 10D is what is called a block. The accommodation member 10D accommodates the relay bus bar 20, the electronic component 30, or the like. The electrical wire We is electrically connected to the relay bus bar 20 and the bus bar 40 of the electronic component 30 within the accommodation member 10D. Thus, in this example, the accommodation chambers 10a and 10c and the insertion ports 10b and 10d are formed in the accommodation member 10D (FIGS. 4 to 6 and 8). The accommodation member 10D in this example is inserted from the second opening $10A_2$ of the frame 10A to be attached to the inside of the frame 10A via a locking structure or the like, with the relay bus bar 20 and the electronic component 30 accommodated therein and the electrical wire We electrically connected to the relay bus bar 20 and the electronic component 30.

The relay bus bar 20 is formed of a conductive material such as metal. The relay bus bar 20 in this example is formed into a plate shape from a metal plate as a base material. The relay bus bar 20 includes a plurality of electrical connection bodies 21 and a coupling body 22 that couples the electrical connection bodies 21 together (FIGS. 2, 4, 5, and 8).

Figure 7:
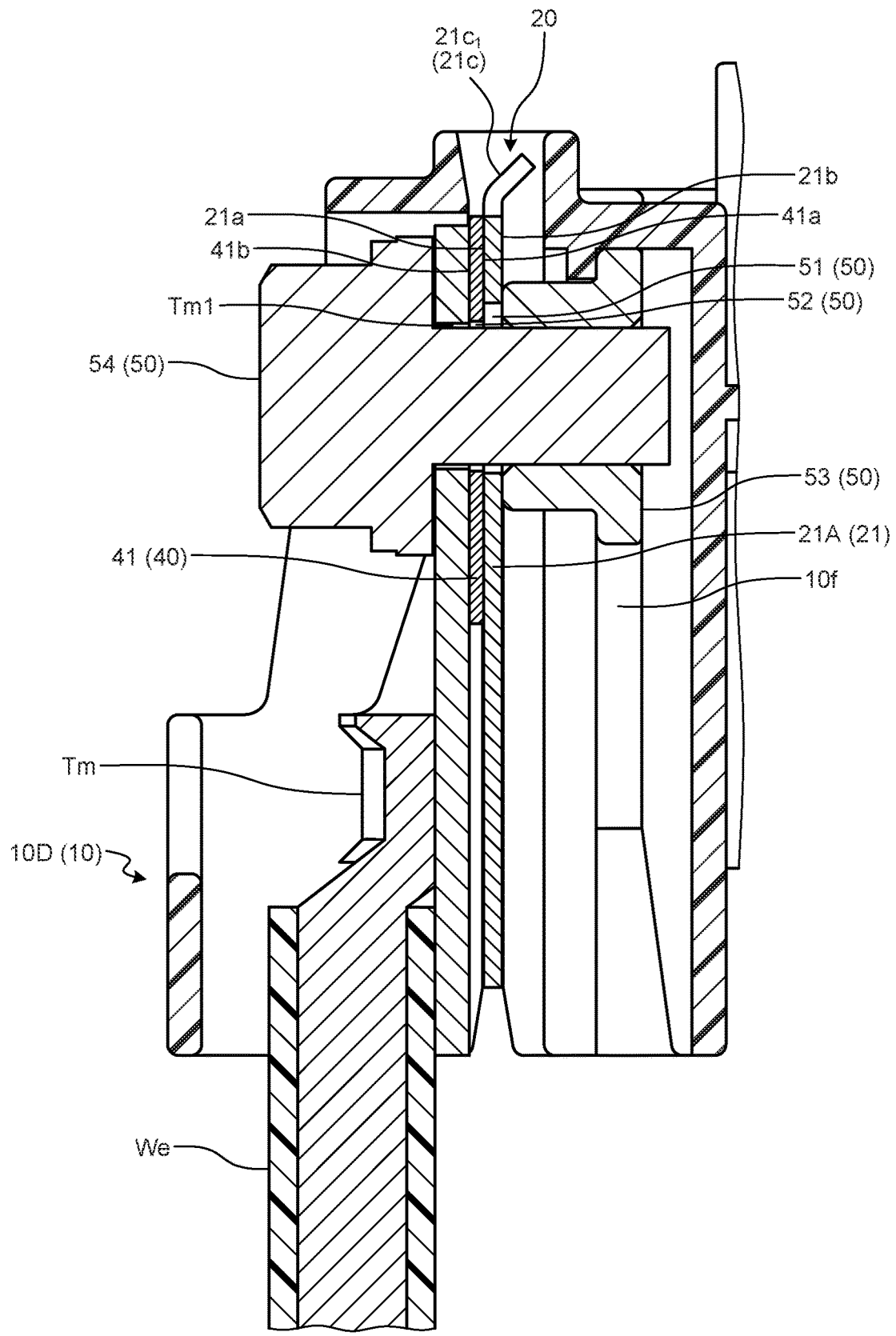
FIG. 7 is a cross sectional view taken along a line X-X in FIG. 4.
Figure 8:
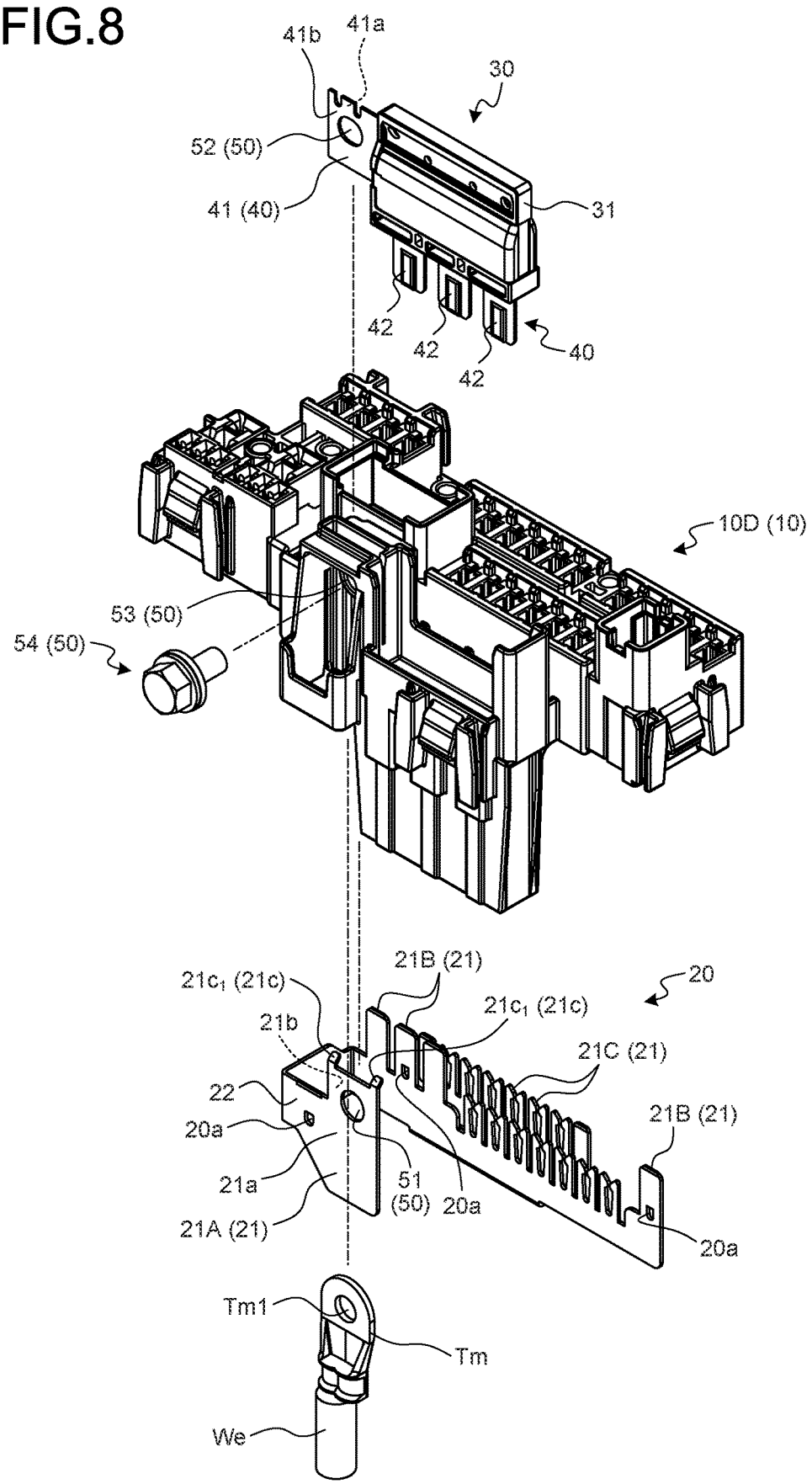
FIG. 8 is an exploded perspective view illustrating the accommodation member and the accommodated component related thereto.

At least one of the electrical connection bodies 21 is a plate-like flat electrical connection body 21A, two flat surfaces 21a and 21b of which extend along an insertion direction of the electronic component 30 with respect to the housing 10 within the housing 10 (FIGS. 7 and 8). The bus bar 40 of the electronic component 30 is physically and electrically connected to the flat electrical connection body 21A. The relay bus bar 20 in this example includes one flat electrical connection body 21A (FIG. 8). The flat electrical connection body 21A in this example is formed in a quadrangular plate shape, one of four sides of which is coupled to the coupling body 22. In the flat electrical connection body 21A in this example, the side coupled to the coupling body 22 extends in the insertion direction of the electronic component 30 with respect to the housing 10. Note that the side of the flat electrical connection body 21A coupled to the coupling body 22 may also extend in a direction perpendicular to the insertion direction of the electronic component 30 with respect to the housing 10.

In the relay bus bar 20, a different type of electronic component (not illustrated) from the electronic component 30 or an electrical wire (not illustrated) is physically and electrically connected to a different electrical connection body 21 from the flat electrical connection body 21A. In addition to the flat electrical connection body 21A, a plurality of male tab-shaped electrical connection bodies 21B and tuning fork terminal-shaped electrical connection bodies 21C are formed in the relay bus bar 20 in this example (FIGS. 4 and 8).

A through hole 20a is formed in each of the electrical connection bodies 21B and the coupling body 22 of the relay bus bar 20 (FIG. 8). In order to hold the relay bus bar 20 at the accommodation completion position in the accommodation chamber 10a, the accommodation member 10D includes a locking claw 10e inserted into the through hole 20a and locked to a peripheral wall of the through hole 20a when the relay bus bar 20 is at the accommodation completion position (FIG. 4). The locking claw 10e is provided for each of the through holes 20a. The relay bus bar 20 is held in the accommodation chamber 10a by the pairs of the through holes 20a and the locking claws 10e.

Figure 9:
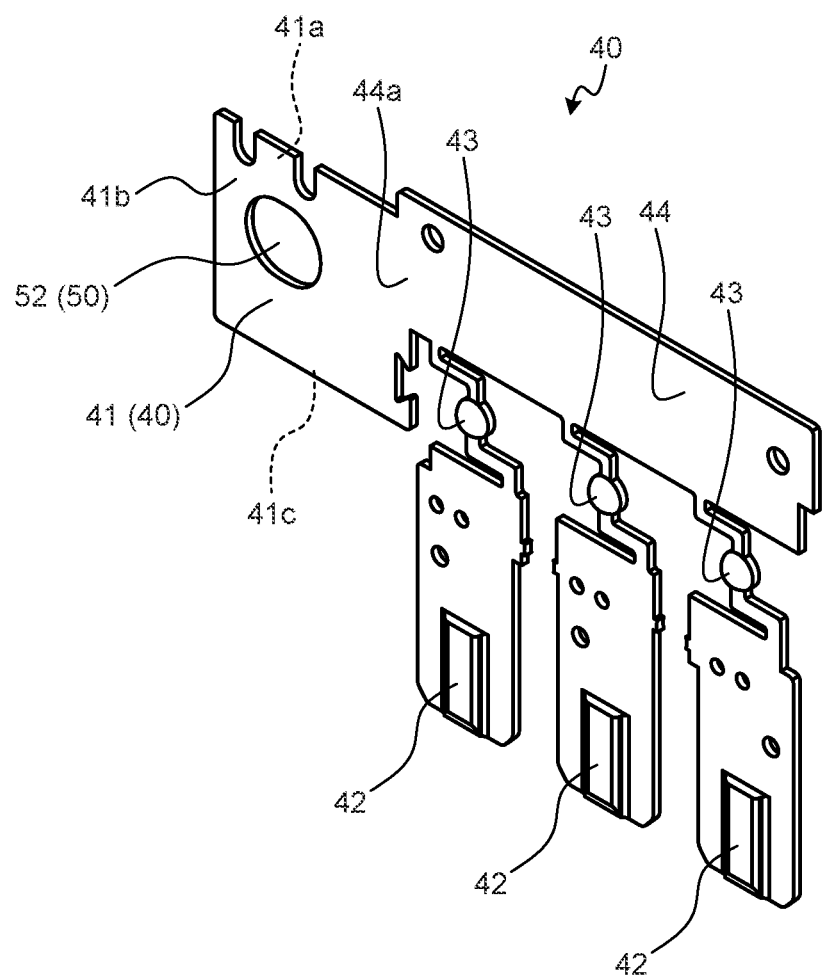
FIG. 9 is a perspective view illustrating a bus bar of the electronic component.

The electronic component 30 includes the conductive bus bar 40. The bus bar 40 includes a flat electrical connection body 41 (FIGS. 4, 8, and 9). The flat electrical connection body 41 is a plate-like electrical connection body, two flat surfaces 41a and 41b of which extend along the insertion direction of the electronic component 30 with respect to the housing 10 (FIGS. 7 to 9). The electronic component 30 is, for example, a circuit protection component such as a fuse and a fusible link, or a relay. Another example of the electronic component 30 may be electronics such as an electronic control unit (so-called ECU).

The bus bar 40 is formed of a conductive material such as metal. The bus bar 40 in this example is formed into a plate shape from a metal plate as a base material.

Here, the circuit protection component (fusible link) is employed as an example of the electronic component 30. The flat electrical connection body 41 of the bus bar 40 in this example is electrically connected to a power side of a vehicle. The bus bar 40 in this example includes a load-side electrical connection body 42 electrically connected to a load side, and a fusible body 43 interposed between the flat electrical connection body 41 and the load-side electrical connection body 42, in addition to the flat electrical connection body 41 (FIG. 9). At least one set of the load-side electrical connection body 42 and the fusible body 43 is provided in the bus bar 40. The bus bar 40 in this example includes three sets of the load-side electrical connection bodies 42 and the fusible bodies 43. A coupling body 44 is interposed between the fusible bodies 43 and the flat electrical connection body 41 (FIG. 9). The flat electrical connection body 41 in this example is formed into a quadrangular plate shape, one of four sides of which is coupled to the coupling body 44. In the flat electrical connection body 41 in this example, the side coupled to the coupling body 44 extends in the insertion direction of the electronic component 30 with respect to the housing 10. Note that the side of the flat electrical connection body 41 coupled to the coupling body 44 may also extend in the direction perpendicular to the insertion direction of the electronic component 30 with respect to the housing 10.

The electronic component 30 in this example includes a case 31 that accommodates the fusible bodies 43 and the coupling body 44 (FIGS. 4, 6, and 8). The case 31 is formed of an insulating material such as synthetic resin. The flat electrical connection body 41 and the load-side electrical connection bodies 42 are projected from the case 31 of the electronic component 30. Each load-side electrical connection body 42 is formed in a male tab shape, to which a load-side electrical wire (not illustrated) is physically and electrically connected.

One the two flat surfaces 21a and 21b and one of the two flat surfaces 41a and 41b (the flat surfaces 21a and 41a) of the respective flat electrical connection bodies 21A and 41 of the relay bus bar 20 and the bus bar 40 are mating surfaces to be brought into contact with each other by the fixing structure 50. The fixing structure 50 joins together the respective flat electrical connection bodies 21A and 41 with the respective mating surfaces 21a and 41a being in contact with each other. Examples of the fixing structure 50 include a screwing structure and a welding structure using, for example, laser welding. Here, the fixing structure 50 by screwing is employed as an example.

The fixing structure 50 in this example includes through holes 51 and 52, a female screw member 53, and a male screw member 54 (FIGS. 7 and 8). The through holes 51 and 52 are formed in the flat electrical connection bodies 21A and 41 of the relay bus bar 20 and the bus bar 40, respectively. The female screw member 53 is arranged facing the other of the two flat surfaces 21a and 21b (the flat surface 21b) of the flat electrical connection body 21A of the relay bus bar 20. The male screw member 54 is inserted through the respective through holes 51 and 52 from the other of the two flat surfaces 41a and 41b (the flat surface 41b) of the flat electrical connection body 41 of the bus bar 40 to be screwed into the female screw member 53. The female screw member 53 is held by a screw holder 10f of the accommodation member 10D (FIG. 7). The screw holder 10f is formed in, for example, a groove shape. The female screw member 53 is fitted into the groove to be held by the screw holder 10f.

The respective flat electrical connection bodies 21A and 41 are fastened jointly with a terminal fitting Tm at an end of the electrical wire We on the power side by the fixing structure 50 (FIGS. 5 and 7). Thus, the terminal fitting Tm has a through hole Tm1 through which the male screw member 54 is inserted (FIGS. 7 and 8). The terminal fitting Tm is disposed on the flat surface 41b of the flat electrical connection body 41 of the bus bar 40.

In the electrical connection box 1 in this example, the female screw member 53 is held by the screw holder 10f of the accommodation member 10D in advance, and the relay bus bar 20 is held in the accommodation chamber 10a of the accommodation member 10D in advance. The through hole 51 of the flat electrical connection body 21A of the relay bus bar 20 is disposed on an extension line of a screw shaft of the female screw member 53 in the accommodation member 10D. The electronic component 30 is inserted from the insertion port 10d and accommodated in the accommodation chamber 10c with the female screw member 53 and the relay bus bar 20 held in the accommodation member 10D as described above. This causes the mating surfaces 21a and 41a of the respective flat electrical connection bodies 21A and 41 of the relay bus bar 20 and the bus bar 40 to be arranged facing each other, and the through holes 51 and 52 of the respective flat electrical connection bodies 21A and 41 to be arranged facing each other in the accommodation member 10D. In the electrical connection box 1, the terminal fitting Tm is disposed on the flat surface 41b of the flat electrical connection body 41 of the bus bar 40, and the through hole Tm1 of the terminal fitting Tm is arranged facing the through holes 51 and 52 of the respective flat electrical connection bodies 21A and 41. In the electrical connection box 1, the male screw member 54 is inserted through the respective through holes 51, 52, and Tm1, which are substantially coaxially arranged, sequentially from the through hole Tm1 of the terminal fitting Tm, and screwed into the female screw member 53. The respective flat electrical connection bodies 21A and 41 and the terminal fitting Tm are thereby fastened jointly.

The electrical connection box 1 does not have a locking structure for directly fixing or holding the electronic component 30 in the housing 10. Thus, in the electrical connection box 1, the electronic component 30 is possibly displaced from the accommodation completion position before the flat electrical connection body 41 of the bus bar 40 at the accommodation completion position is joined to the flat electrical connection body 21A of the relay bus bar 20 by the fixing structure 50 after the electronic component 30 is accommodated in the accommodation chamber 10c.

To solve the problem, the electrical connection box 1 of the present embodiment has a temporary holding structure that temporarily holds the electronic component 30 at the accommodation completion position with respect to the housing 10. The temporary holding structure temporarily holds the electronic component 30 at the accommodation completion position with respect to the housing 10 at least until the flat electrical connection body 41 of the bus bar 40 at the accommodation completion position is joined to the flat electrical connection body 21A of the relay bus bar 20 by the fixing structure 50 after the electronic component 30 is accommodated in the accommodation chamber 10c. The temporary holding structure is configured as follows.

First, at least one of the respective flat electrical connection bodies 21A and 41 of the relay bus bar 20 and the bus bar 40 is given such flexibility as to enable elastic deformation in a direction crossing the respective mating surfaces 21a and 41a. The at least one of the respective flat electrical connection bodies 21A and 41 applies a reaction force accompanying the elastic deformation to the other flat electrical connection body, to which the one flat electrical connection body is to be connected, in a state in which the flat electrical connection body 41 of the bus bar 40 at the accommodation completion position has not been connected to the flat electrical connection body 21A of the relay bus bar 20 by the fixing structure 50. Moreover, the housing 10 includes a receiving portion 10g that receives, from the electronic component 30, a force applied to the flat electrical connection body 41 of the bus bar 40 from the flat electrical connection body 21A of the relay bus bar 20 (FIG. 4).

The electronic component 30 is thereby locked by the flat electrical connection body 21A of the relay bus bar 20 and the receiving portion 10g of the housing 10 at the accommodation completion position. The temporary holding structure keeps the elastic deformation of at least one of the respective flat electrical connection bodies 21A and 41 at least until the flat electrical connection body 41 of the bus bar 40 at the accommodation completion position is joined to the flat electrical connection body 21A of the relay bus bar 20 by the fixing structure 50 after the electronic component 30 is accommodated in the accommodation chamber 10c. Thus, the electrical connection box 1 can maintain the lock state of the electronic component 30 at the accommodation completion position by the flat electrical connection body 21A of the relay bus bar 20 and the receiving portion 10g of the housing 10 during this time. As described above, the electrical connection box 1 of the present embodiment can temporarily hold the electronic component 30 at the accommodation completion position with respect to the housing 10 using the simple structure as described above until the flat electrical connection body 41 of the bus bar 40 at the accommodation completion position is joined to the flat electrical connection body 21A of the relay bus bar 20 by the fixing structure 50 after the electronic component 30 is accommodated in the accommodation chamber 10c.

The receiving portion 10g is disposed in the accommodation member 10D. For example, a sandwiching portion 10h is disposed in the accommodation member 10D so as to sandwich an end 44a of the coupling body 44 beside the flat electrical connection body 41 of the bus bar 40 (FIG. 4). In this example, the sandwiching portion 10h serves as the receiving portion 10g, receiving the force applied to the flat electrical connection body 41 of the bus bar 40 from the flat electrical connection body 21A of the relay bus bar 20.

In the electrical connection box 1, at least one of the respective flat electrical connection bodies 21A and 41 of the relay bus bar 20 and the bus bar 40 is elastically deformed as described below when the electronic component 30 is at the accommodation completion position. In the electrical connection box 1, the flat electrical connection body 21A of the relay bus bar 20 within the housing 10 is disposed on an insertion trajectory of the flat electrical connection body 41 of the bus bar 40 with respect to the housing 10. Employing such arrangement in the electrical connection box 1 enables at least one of the respective flat electrical connection bodies 21A and 41 to be elastically deformed in bringing the mating surfaces 21a and 41a of the respective flat electrical connection bodies 21A and 41 into contact with each other while the electronic component 30 is being inserted to the accommodation completion position.

When the flat electrical connection body 21A of the relay bus bar 20 is disposed on the insertion trajectory of the flat electrical connection body 41 of the bus bar 40, their end surfaces can collide with each other before the contact of the mating surfaces 21$a$ and 41$a$, stopping the electronic component 30 from being inserted any further. Thus, the flat electrical connection body 21A of the relay bus bar 20 includes, at its end near the insertion port 10$d$ of the electronic component 30 within the housing 10, a guiding portion 21$c$ that guides the mating surface 41$a$ of the flat electrical connection body 41 of the bus bar 40 inserted from the insertion port 10$d$ to the mating surface 21$a$ (FIGS. 4 to 8).

The guiding portion 21$c$ is a portion, within the flat electrical connection body 21A of the relay bus bar 20, firstly brought into contact with the flat electrical connection body 41 of the bus bar 40 inserted from the insertion port 10$d$. The guiding portion 21$c$ is projected from an end surface of the flat electrical connection body 21A near the insertion port 10$d$ of the electronic component 30 within the housing 10, to a side opposite to the mating surface 21$a$. A wall surface 21$c_1$ of the guiding portion 21$c$, with which the flat electrical connection body 41 of the bus bar 40 inserted from the insertion port 10$d$ firstly comes into contact, is contiguous with the mating surface 21$a$ (FIGS. 4 and 6 to 8). Thus, an end 41$c$ (FIG. 9) of the flat electrical connection body 41 of the bus bar 40 comes into contact with the wall surface 21$c_1$ of the guiding portion 21$c$ when inserted from the insertion port 10$d$. When the end 44$a$ of the coupling body 44 beside the flat electrical connection body 41 of the bus bar 40 is sandwiched by the sandwiching portion 10$h$, a force accompanying the insertion of the electronic component 30 is applied to the wall surface of the guiding portion 21$c$ from the end 41$c$. The force starts the elastic deformation of at least one of the respective flat electrical connection bodies 21A and 41 of the relay bus bar 20 and the bus bar 40. As the electronic component 30 is further inserted, the amount of elastic deformation increases. In the respective flat electrical connection bodies 21A and 41, the end 41$c$ of the flat electrical connection body 41 is guided to the mating surface 21$a$ of the flat electrical connection body 21A along the wall surface 21$c_1$ of the guiding portion 21$c$ when the electronic component 30 is further inserted. The mating surface 41$a$ of the flat electrical connection body 41 is thereby arranged facing the mating surface 21$a$ in a contacting state. The flat electrical connection body 41 of the bus bar 40 is inserted to the accommodation completion position with the mating surfaces 21$a$ and 41$a$ arranged facing each other in the contacting state.

The guiding portion 21$c$ in this example is formed as a piece body bent to the side opposite to the mating surface 21$a$ from the end surface of the flat electrical connection body 21A near the insertion port 10$d$. The guiding portion 21$c$ in this example thereby serves not only to guide the flat electrical connection body 41 of the bus bar 40 inserted from the insertion port 10$d$ to the accommodation completion position, but also to pick up the flat electrical connection body 41 as a trigger for starting the guiding operation. Two of the guiding portions 21$c$ are provided on the end surface of the flat electrical connection body 21A.

Figure 10:
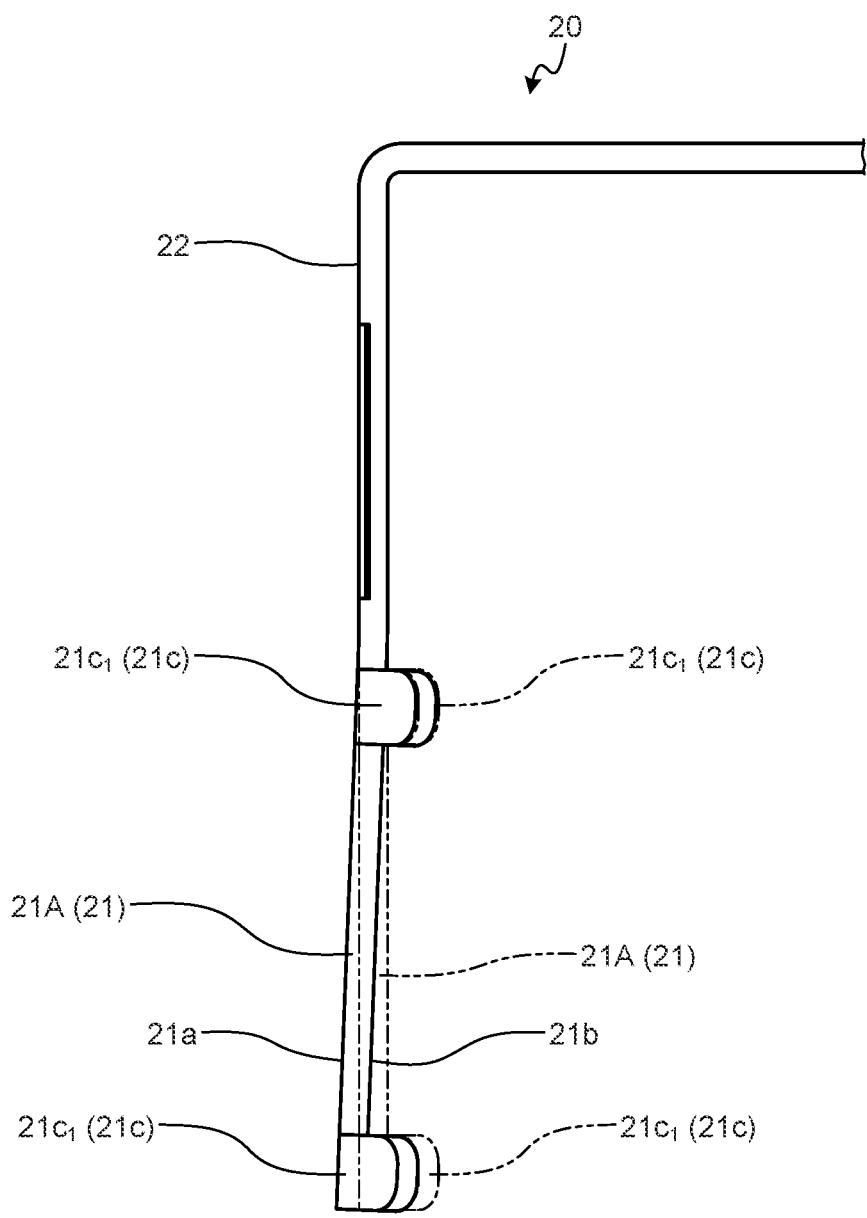
FIG. 10 is a plan view for explaining the relay bus bar.

In this example, only the flat electrical connection body 21A of the relay bus bar 20 has flexibility. A reaction force accompanying the elastic deformation of the flat electrical connection body 21A is applied to the mating surface 41$a$ of the flat electrical connection body 41 of the counterpart bus bar 40 from the mating surface 21$a$. For example, the flat electrical connection body 21A of the relay bus bar 20 is formed in an inclined state toward the mating surface 21$a$ from an end beside the coupling body 22 (the side coupled to the coupling body 22) with respect to the state in which the respective flat electrical connection bodies 21A and 41 are joined together by the fixing structure 50 (FIG. 10). The flat electrical connection body 21A of the relay bus bar 20 is thereby disposed on the insertion trajectory of the flat electrical connection body 41 of the bus bar 40 within the housing. Thus, the flat electrical connection body 21A of the relay bus bar 20 starts to be elastically deformed toward the flat surface 21$b$ opposite to the inclination direction by a force applied to the wall surfaces 21$c_1$ of the guiding portions 21$c$ from the end 41$c$ of the flat electrical connection body 41 of the bus bar 40 inserted from the insertion port 10$d$. A two-dot chain line in FIG. 10 shows an example of the flat electrical connection body 21A of the relay bus bar 20 joined to the flat electrical connection body 41 of the bus bar 40 by the fixing structure 50.

The flat electrical connection body 21A of the relay bus bar 20 has a largest amount of elastic deformation when the electronic component 30 is inserted to the accommodation completion position. The reaction force accompanying the elastic deformation is applied to the mating surface 41$a$ of the flat electrical connection body 41 of the bus bar 40 from the mating surface 21$a$. The electronic component 30 at the accommodation completion position applies a force against the reaction force from the mating surface 21$a$ to the mating surface 21$a$ of the flat electrical connection body 21A of the relay bus bar 20 from the mating surface 41$a$ of the flat electrical connection body 41 of the bus bar 40. The forces are balanced between the mating surfaces 21$a$ and 41$a$ of the respective flat electrical connection bodies 21A and 41. Moreover, the electronic component 30 at the accommodation completion position applies a force according to the reaction force from the mating surface 21$a$ to the receiving portion 10$g$ (the sandwiching portion 10$h$) from the end 44$a$ of the coupling body 44 beside the flat electrical connection body 41 of the bus bar 40. A force against this force is applied to the end 44$a$ of the coupling body 44 from the receiving portion 10$g$ (the sandwiching portion 10$h$). Thus, in the electronic component 30 at the accommodation completion position, the forces are balanced between the end 44$a$ of the coupling body 44 and the receiving portion 10$g$ (the sandwiching portion 10$h$). The electronic component 30 at the accommodation completion position is held in the housing 10 using the equilibrium of forces at the two positions.

When only the flat electrical connection body 41 of the bus bar 40 has flexibility, a reaction force accompanying the elastic deformation of the flat electrical connection body 41 is applied to the mating surface 21$a$ of the flat electrical connection body 21A of the counterpart relay bus bar 20 from the mating surface 41$a$. For example, the flat electrical connection body 41 of the bus bar 40 is inclined toward the mating surface 41$a$ from an end beside the coupling body 44 (the side coupled to the coupling body 44) with respect to the state in which the respective flat electrical connection bodies 21A and 41 are joined together by the fixing structure 50. The flat electrical connection body 21A of the relay bus bar 20 is thereby disposed on the insertion trajectory of the flat electrical connection body 41 of the bus bar 40 within the housing. When inserted from the insertion port 10$d$, the end 41$c$ of the flat electrical connection body 41 of the bus bar 40 applies a force to the wall surfaces 21$c_1$ of the guiding portions 21$c$ of the relay bus bar 20. A force against this force is applied to the end 41$c$ from the wall surfaces 21$c_1$. The flat electrical connection body 41 of the bus bar 40 thereby starts to be elastically deformed toward the flat surface 41$b$ opposite to the inclination direction.

The flat electrical connection body 41 of the bus bar 40 has a largest amount of elastic deformation when the electronic component 30 is inserted to the accommodation completion position. The reaction force accompanying the elastic deformation is applied to the mating surface 21a of the flat electrical connection body 21A of the relay bus bar 20 from the mating surface 41a. A force against the reaction force is thereby applied to the mating surface 41a of the flat electrical connection body 41 from the mating surface 21a of the flat electrical connection body 21A. In the electronic component 30 at the accommodation completion position, the forces are balanced between the mating surfaces 21a and 41a of the respective flat electrical connection bodies 21A and 41. Moreover, the electronic component 30 at the accommodation completion position applies a force according to the force from the mating surface 21a to the receiving portion 10g (the sandwiching portion 10h) from the end 44a of the coupling body 44 beside the flat electrical connection body 41 of the bus bar 40. A force against this force is applied to the end 44a of the coupling body 44 from the receiving portion 10g (the sandwiching portion 10h). Thus, in the electronic component 30 at the accommodation completion position, the forces are balanced between the end 44a of the coupling body 44 and the receiving portion 10g (the sandwiching portion 10h). The electronic component 30 at the accommodation completion position is held in the housing 10 using the equilibrium of forces at the two positions.

As described above, in the electrical connection box 1 of the present embodiment, the mating surfaces 21a and 41a of the respective flat electrical connection bodies 21A and 41 can be pushed against each other by elastically deforming at least one of the respective flat electrical connection bodies 21A and 41 at least until the flat electrical connection body 41 of the bus bar 40 at the accommodation completion position is joined to the flat electrical connection body 21A of the relay bus bar 20 by the fixing structure 50 after the electronic component 30 is accommodated in the accommodation chamber 10c. In order to enable the elastic deformation, the housing 10 includes the receiving portion 10g that receives, from the electronic component 30, the force applied to the flat electrical connection body 41 of the bus bar 40 from the flat electrical connection body 21A of the relay bus bar 20. The electrical connection box 1 can temporarily hold the electronic component 30 in the housing 10 using the simple structure as described above at least until the flat electrical connection body 41 of the bus bar 40 at the accommodation completion position is joined to the flat electrical connection body 21A of the relay bus bar 20 by the fixing structure 50 after the electronic component 30 is accommodated in the accommodation chamber 10c. The wire harness WH, which includes the above-described electrical connection box 1, can similarly provide the effects obtained by the electrical connection box 1.

In the electrical connection box according to the present embodiment, the mating surfaces of the respective flat electrical connection bodies can be pushed against each other by elastically deforming at least one of the respective flat electrical connection bodies at least until the flat electrical connection body of the bus bar at the accommodation completion position is joined to the flat electrical connection body of the relay bus bar by the fixing structure after the electronic component is accommodated in the accommodation chamber of the housing. In order to enable the elastic deformation, the housing includes the receiving portion that receives, from the electronic component, the force applied to the flat electrical connection body of the bus bar from the flat electrical connection body of the relay bus bar. The electrical connection box can temporarily hold the electronic component in the housing using the simple structure as described above at least until the flat electrical connection body of the bus bar at the accommodation completion position is joined to the flat electrical connection body of the relay bus bar by the fixing structure after the electronic component is accommodated in the accommodation chamber of the housing. The wire harness according to the present embodiment, which includes the above-described electrical connection box, can similarly provide the effects obtained by the electrical connection box.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electrical connection box comprising:
    an insulating housing;
    a conductive relay bus bar held by the housing within the housing;
    an electronic component inserted to an accommodation completion position within the housing and provided with a conductive bus bar connected to the relay bus bar; and
    a fixing structure that physically and electrically connects the bus bar at the accommodation completion position to the relay bus bar held by the housing, wherein
    the relay bus bar includes a plurality of electrical connection bodies and a coupling body coupling the electrical connection bodies,
    at least one of the electrical connection bodies is a flat electrical connection body, the flat electrical connection body has a plate shape with two flat surfaces that extend along an insertion direction of the electronic component with respect to the housing within the housing,
    the bus bar includes a flat electrical connection body, the flat electrical connection body of the bus bar has a plate shape with two flat surfaces that extend along the insertion direction,
    one of the two flat surfaces of the flat electrical connection body of the relay bus bar and one of the two flat surfaces of the flat electrical connection body of the bus bar are mating surfaces brought into physical contact with each other by the fixing structure,
    one of the flat electrical connection bodies of the relay bus bar and the bus bar is elastically deformed in a direction crossing the mating surfaces by a different one of the flat electrical connection bodies, which applies a reaction force to the different one of the flat electrical connection bodies, and
    the housing includes a receiving portion that receives, from the electronic component, the reaction force applied to the different one of the flat electrical connection bodies.

2. The electrical connection box according to claim 1, wherein
    the flat electrical connection body of the relay bus bar within the housing is disposed on an insertion trajectory of the flat electrical connection body of the bus bar with respect to the housing.

3. The electrical connection box according to claim 1, wherein the housing has an insertion port through which the electronic component is inserted to the accommodation completion position, and the flat electrical connection body of the relay bus bar includes, an end near the insertion port within the housing, and a guiding portion at the end, the guiding portion guides the mating surface of the flat electrical connection body of the bus bar inserted from the insertion port to the mating surface of the flat electrical connection body of the relay bus bar.

4. The electrical connection box according to claim 2, wherein the housing has an insertion port through which the electronic component is inserted to the accommodation completion position, and the flat electrical connection body of the relay bus bar includes, an end near the insertion port within the housing, a guiding portion at the end, the guiding portion guides the mating surface of the flat electrical connection body of the bus bar inserted from the insertion port to the mating surface of the flat electrical connection body of the relay bus bar.

5. The electrical connection box according to claim 1, wherein the fixing structure includes through holes respectively formed in the flat electrical connection bodies of the relay bus bar and the bus bar, a female screw member arranged facing the other of the two flat surfaces of the flat electrical connection body of the relay bus bar, and a male screw member inserted through the through holes from the other of the two flat surfaces of the flat electrical connection body of the bus bar to be screwed into the female screw member.

6. The electrical connection box according to claim 2, wherein the fixing structure includes through holes respectively formed in the flat electrical connection bodies of the relay bus bar and the bus bar, a female screw member arranged facing the other of the two flat surfaces of the flat electrical connection body of the relay bus bar, and a male screw member inserted through the through holes from the other of the two flat surfaces of the flat electrical connection body of the bus bar to be screwed into the female screw member.

7. The electrical connection box according to claim 3, wherein the fixing structure includes through holes respectively formed in the flat electrical connection bodies of the relay bus bar and the bus bar, a female screw member arranged facing the other of the two flat surfaces of the flat electrical connection body of the relay bus bar, and a male screw member inserted through the through holes from the other of the two flat surfaces of the flat electrical connection body of the bus bar to be screwed into the female screw member.

8. The electrical connection box according to claim 4, wherein the fixing structure includes through holes respectively formed in the flat electrical connection bodies of the relay bus bar and the bus bar, a female screw member arranged facing the other of the two flat surfaces of the flat electrical connection body of the relay bus bar, and a male screw member inserted through the through holes from the other of the two flat surfaces of the flat electrical connection body of the bus bar to be screwed into the female screw member.

9. A wire harness comprising:

an insulating housing;

a conductive relay bus bar held by the housing within the housing;

an electronic component inserted to an accommodation completion position within the housing and provided with a conductive bus bar connected to the relay bus bar;

a fixing structure that physically and electrically connects the bus bar at the accommodation completion position to the relay bus bar held by the housing; and an electrical wire electrically connected to the relay bus bar and the bus bar and pulled out from an inside of the housing, wherein the relay bus bar includes a plurality of electrical connection bodies and a coupling body coupling the electrical connection bodies, at least one of the electrical connection bodies is a flat electrical connection body, the flat electrical connection body has a plate shape with two flat surfaces that extend along an insertion direction of the electronic component with respect to the housing within the housing, the bus bar includes a flat electrical connection body, the flat electrical connection body of the bus bar has a plate shape with two flat surfaces that extend along the insertion direction, one of the two flat surfaces of the flat electrical connection body of the relay bus bar and one of the two flat surfaces of the flat electrical connection body of the bus bar are mating surfaces brought into physical contact with each other by the fixing structure, one of the flat electrical connection bodies of the relay bus bar and the bus bar is elastically deformed in a direction crossing the mating surfaces by a different one of the flat electrical connection bodies, which applies a reaction force to the different one of the flat electrical connection bodies, and the housing includes a receiving portion that receives, from the electronic component, the reaction force applied to the different one of the flat electrical connection bodies.

* * * * *